United States Patent [19]

Fredette

[11] 4,393,036
[45] Jul. 12, 1983

[54] PRODUCTION OF MIXED SULFURIC AND HYDROCHLORIC ACID FEED AND CHLORINE DIOXIDE GENERATION THEREWITH

[75] Inventor: Maurice C. J. Fredette, Mississauga, Canada

[73] Assignee: ERCO Industries Limited, Islington, Canada

[21] Appl. No.: 319,971

[22] Filed: Nov. 10, 1981

[51] Int. Cl.³ .................. C01B 7/01; C01B 11/02; C01B 17/74
[52] U.S. Cl. .................. 423/478; 423/486; 423/522
[58] Field of Search .................. 423/477, 478, 486, 481

[56] References Cited

U.S. PATENT DOCUMENTS

| | | | |
|---|---|---|---|
| 804,515 | 11/1905 | Askenasy | 423/486 |
| 1,781,830 | 11/1930 | Barstow | 423/486 |
| 3,492,091 | 1/1970 | Goldman | 423/486 |
| 4,086,329 | 8/1978 | Cowley | 423/478 |

OTHER PUBLICATIONS

Masschelein, *Chlorine Dioxide*, Ann Arbor Science, Ann Arbor, Mich., (1979), pp. 112–119.

*Primary Examiner*—Brian E. Hearn
*Attorney, Agent, or Firm*—Sim & McBurney

[57] ABSTRACT

A mixture of hydrochloric acid and sulphuric acid for use as a feed to a chlorine dioxide generator to provide reactant chemicals therefor is formed by the reaction of chlorine, sulphur dioxide and water. The reaction is effected in the presence of excess chlorine to avoid the presence of dissolved sulphur dioxide in the acid mixture. The proportion of the excess of the chlorine also can be used to control the strength of the acid mixture which can be made without dissolved sulphur dioxide.

9 Claims, 3 Drawing Figures

4,393,036

PRODUCTION OF MIXED SULFURIC AND HYDROCHLORIC ACID FEED AND CHLORINE DIOXIDE GENERATION THEREWITH

FIELD OF INVENTION

The present invention relates to the production of chlorine dioxide, and more particularly to the production of a mixture of hydrochloric acid and sulphuric acid for utilization therein.

BACKGROUND TO THE INVENTION

In U.S. Pat. No. 3,864,456, assigned to the assignee of this application, there is described a process for the production of chlorine dioxide and chlorine wherein sodium chlorate is reduced with added chloride ions in an aqueous acid reaction medium containing sulphuric acid at a low total acid normality in the range of about 2 to about 4.8 normal. The reaction medium is maintained at its boiling point under a subatmospheric pressure, so that chlorine dioxide and chlorine are removed from the reaction medium in gaseous admixture with steam. By-product anhydrous neutral sodium sulphate is deposited from reaction medium once the reaction medium becomes saturated therewith after start up. The gaseous mixture of chlorine dioxide, chlorine and steam removed from the reaction zone is contacted with water, usually after at least partial condensation of the steam, to form a chlorine dioxide solution also containing dissolved quantities of chlorine.

It has previously been suggested in U.S. Pat. No. 3,347,628 to form an aqueous chlorine dioxide solution from a gaseous mixture of chlorine dioxide, chlorine and steam removed from a chlorine dioxide generator to which external steam is added to dilute the gases, by contact of the gaseous mixture with water. In this prior process, the chlorine gas remaining from the absorption is reacted with sulphur dioxide and water to form sulphuric acid and hydrochloric acid, which are fed to the chlorine dioxide generator.

As is set forth in detail in U.S. Pat. No. 4,086,329 assigned to the assignee of this application, the latter concept is not directly utilizable in the process of U.S. Pat. No. 3,864,456, since the chemical efficiency of chlorine dioxide production under boiling reaction medium, subatmospheric pressure and low total acid normality conditions is less than 100% in the latter process. As described in U.S. Pat. No. 4,086,329, a critical adjustment of the hydrogen and chloride ion concentration of the acid feed is required to take this inefficiency into account, otherwise continuous operation is impractical.

It has now been found that the presence of dissolved unreacted sulphur dioxide in the hydrochloric acid and sulphuric acid mixture resulting from the reaction of chlorine, sulphur dioxide and water and forwarded to the reaction medium is detrimental to the chlorine dioxide-generating process, even in very small concentrations. Often cell liquor, i.e. the sodium chlorate solution resulting from diaphragmless electrolysis of sodium chloride solution, is used as the source of sodium chlorate feed to the reaction medium. Such cell liquor usually contains dissolved quantities of sodium dichromate, as a result of the beneficial utilization of such chemical in the electrolysis reaction. The presence of dissolved quantities of sulphur dioxide in the mixed acid stream has been found to reduce the dichromate ions to trivalent chromium, which in turn causes the anhydrous sodium sulphate precipitate to form as very fine crystals which are very difficult to filter or otherwise separate from the reaction medium. Further, in the absence of dichromate ions from the reaction medium, the presence of dissolved quantities of sulphur dioxide in the mixed acid stream has been found to decrease the efficiency of chlorine dioxide production.

A procedure in which the by-product chlorine from the chlorine dioxide absorption is reacted with sulphur dioxide and water to form a mixture of sulphuric acid and hydrochloric acid for reuse in the chlorine dioxide generator nevertheless is a commercially-attractive one. Since the hydrochloric acid is used to provide at least part of the chloride ion requirement and part of the acid requirement for the chlorine dioxide-producing process, the overall amount of sodium sulphate produced per mole of chlorine dioxide produced is decreased when compared to a process wherein sodium chloride provides all the chloride ion requirement and sulphuric acid provides all the acid requirement, as is apparent from consideration of the following equations:

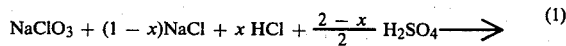

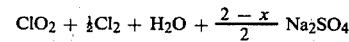

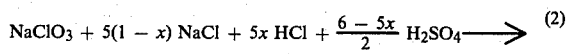

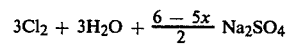

wherein x is the molar proportion of HCl which is used and is a decimal value which is less than or equal to 1.00. Equation (1) represents the reaction which produces chlorine dioxide and the extent to which the reaction of equation (1) predominates over equation (2) is the efficiency of chlorine dioxide production.

It will be seen that the proportion of sodium sulphate which is produced declines as the proportion of hydrochloric acid used in place of sodium chloride and sulphuric acid increases. The requirements of pulp mills for sodium sulphate have declined while requirements for chlorine dioxide have increased. The ability to produce less sodium sulphate through the use of hydrochloric acid, therefore, is beneficial.

Further, since chlorine gas from the absorption is reacted to form reutilizable chemicals, the necessity for separate absorption of chlorine, usually in sodium hydroxide solution to form hypochlorite, is substantially decreased. With the increasing tendency to substitute chlorine dioxide for a substantial proportion of the chlorine which has formerly been used to effect bleaching in the first stage of a multistage bleaching operation, the requirements for chlorine have decreased while those for chlorine dioxide have increased.

SUMMARY OF INVENTION

It has surprisingly been found that the presence of dissolved sulphur dioxide in the mixture of hydrochloric acid and sulphuric acid produced by the reaction of sulphur dioxide, chlorine and water can be avoided by utilizing a defined excess of chlorine in the reaction.

The excess of chlorine which is required to avoid the presence of dissolved sulphur dioxide in the mixed acid product increases substantially linearly with increasing strength of mixed acid produced. This result is surprising since it has previously been believed that, since chlorine and sulphur dioxide react in stoichiometrically-related quantities, the acid strength should have little or no effect on the required chlorine partial pressure.

The effect of the excess chlorine on dissolved sulphur dioxide concentration in the mixed acid product is substantially linear in character. Thus, for a given strength of mixture of hydrochloric acid and sulphuric acid, the dissolved concentration of sulphur dioxide decreases to zero and thereafter a dissolved concentration of chlorine increases linearly with increased excess gaseous chlorine concentration.

GENERAL DESCRIPTION OF INVENTION

The reaction of sulphur dioxide, chlorine and water is effected, in the present invention, in a reaction zone, which may comprise a single reaction vessel or two or more reaction vessels, having an inlet for gaseous sulphur dioxide, an inlet for gaseous chlorine and air, an inlet for water to act as reactant and absorption medium for the acids, an outlet for a mixture of hydrochloric acid and sulphuric acid, and an outlet for excess chlorine and air. In accordance with the present invention, the partial pressure of chlorine in the outlet mixture of chlorine and air determines the concentration of sulphur dioxide present in the mixed acid product stream.

When the flow rate of water to the reaction zone is such as to produce a substantially fixed total acid normality of mixed acid product stream, an increase in the flow rate of chlorine such as to increase the partial pressure of chlorine at the outlet of the reaction zone alters the concentration of dissolved gases in the mixed acid outlet stream in a linear manner.

For example, at a mixed acid strength of 6.5 N, considered as the total acid normality of the mixture of hydrochloric acid and sulphuric acid, a partial pressure of chlorine at the gaseous outlet of 100 mm Hg results in a dissolved sulphur dioxide concentration of 1 gpl in the mixed acid, while a partial pressure of chlorine of about 150 mm Hg results in a dissolved sulphur dioxide concentration of 0 gpl. As the chlorine partial pressure increases further, the mixed acid has a dissolved chlorine concentration which increases with increased chlorine partial pressure.

Even such a small amount of dissolved $SO_2$ as 1 gpl has an adverse effect on the chlorine dioxide-producing reaction, in terms of decreased efficiency and, in the case of the presence of dichromate ions, in terms of settlability and recoverability of by-product sodium sulphate. In accordance with this invention, the dissolved concentration of sulphur dioxide is controlled at 0 gpl by suitable control of the partial pressure of chlorine at the gaseous outlet from the reaction zone.

The presence of dissolved chlorine in the mixed acid feed does not appear to adversely affect the chlorine dioxide-producing process, but nevertheless, other than a very minor amount to ensure the absence of dissolved sulphur dioxide, dissolved chlorine usually is avoided, since such chlorine merely constitutes a dead load on the system, in that it leaves the generator zone with the gaseous products of reaction and is recycled to the sulphur dioxide-chlorine-water reaction zone in the chlorine feed stream.

The partial pressure of chlorine required to achieve an absence of dissolved sulphur dioxide from the mixed acid product increases in linear manner as the total acid normality increases. In other words, the partial pressure of chlorine at the outlet varies linearly with the total acid normality of a mixed acid from which dissolved sulphur dioxide is absent.

For example, a mixed acid stream of 6.5 N total acid normality and 0 gpl dissolved $SO_2$ is produced at 150 mm Hg partial pressure of gaseous chlorine at the gaseous outlet while a mixed acid stream of 14 N total acid normality and 0 gpl dissolved $SO_2$ is produced at 550 mm Hg partial pressure of gaseous chlorine.

In view of the linear relationships noted above, the partial pressure of chlorine at the gaseous outlet of the reaction zone is readily, reliably and reproducibly used to control total acid normality and concentration of dissolved gases in the mixed acid.

DESCRIPTION OF THE PREFERRED EMBODIMENT

Figure 1:
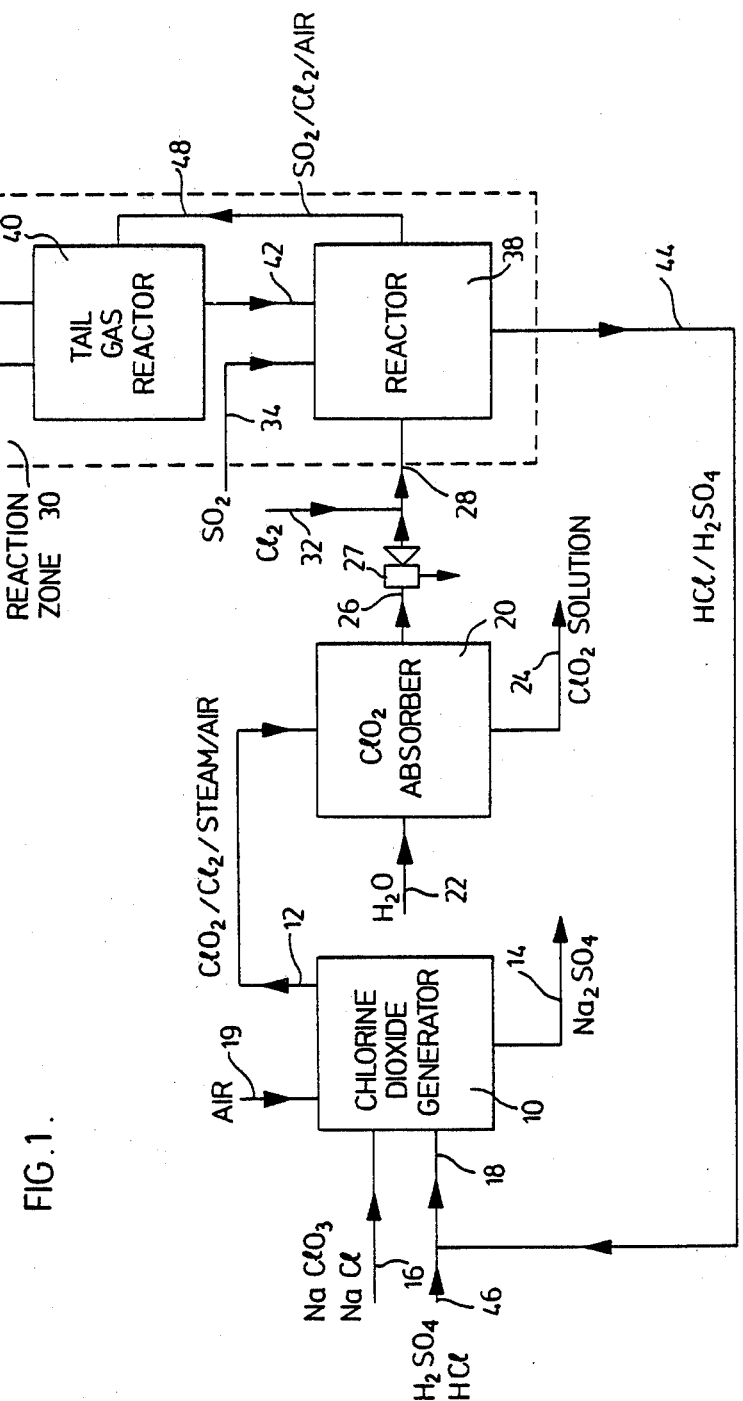
FIG. 1 is a schematic flow sheet of one embodiment of the method of the invention.

Referring to FIG. 1, chlorine dioxide is formed continuously in accordance with the process of U.S. Pat. No. 3,864,456 in a chlorine dioxide generator 10. Chlorine dioxide, chlorine and steam are formed in the generator 10 as the gaseous products of reaction are continuously removed by line 12. Anhydrous neutral sodium sulphate is also formed in the generator 10 as the solid product of reaction is continuously or intermittently removed by line 14.

The generator 10 holds an aqueous acid reaction medium containing chlorate ions which are continuously fed thereto in the form of a sodium chlorate solution by line 16. The sodium chlorate solution fed by line 16 may take the form of cell liquor, in which case the feed stream also contains sodium chloride. The reaction medium is maintained at its boiling point under a subatmospheric pressure and has a total acid normality of about 2 to about 4.8 normal. The acid is provided by a mixture of sulphuric acid and hydrochloric acid, continuously fed to the generator by line 18.

The gaseous mixture of chlorine dioxide, chlorine, steam and air resulting from bleed air stream 19 is forwarded, usually after an initial cooling to condense at least a major proportion of the steam in the stream in a cooler (not shown), to a chlorine dioxide absorber 20 to which water is fed by line 22 to dissolve the chlorine dioxide therefrom and form a product solution stream of chlorine dioxide solution in line 24. Some of the chlorine contained in the gaseous mixture in line 12 is also dissolved in the chlorine dioxide solution.

The residual gas stream in line 26 is forwarded to an air ejector 27 whereby the vacuum is drawn for the generator 10. The chlorine and air stream, now at substantially atmospheric pressure, is forwarded by line 28 to a reaction zone 30 wherein the chlorine, supplemented, if required, by external source chlorine in line 32, is reacted with sulphur dioxide fed by line 34 and water fed by line 36.

The reaction zone 30, in the illustrated embodiment, comprises a primary reactor 38 and a tail-gas reactor 40. The chlorine feed stream 28 and the sulphur dioxide feed stream 34 are directly fed to the primary reactor 38 for reaction with a weak acid solution in line 42 emanating from the tail-gas reactor 40 to form an aqueous mixture of hydrochloric acid and sulphuric acid of desired strength.

The primary reactor 38 may comprise a falling film abosorber while the secondary reactor 40 may comprise a packed tower. A reaction zone 30 for the mixture of sulphur dioxide, chlorine and water utilizing this combination is described in my copending U.S. patent application Ser. No. 317,518 filed Nov. 2, 1981, the disclosure of which is incorporated herein by reference.

As is set forth in more detail therein, in a falling film reactor, the water constitutes the falling film and the chlorine and sulphur dioxide gases are readily absorbed by the aqueous phase for reaction. Integral cooling passages in the falling film absorber enable the exothermic reaction to be controlled by the passages of a cool heat exchange medium, ususally water, therethrough.

As the gases pass through the falling film absorber and reaction with the water occurs, the partial pressure of chlorine and sulphur dioxide in the gaseous phase decreases, thereby resulting in a decrease of the mass transfer rate of the gases to the liquid phase. Accordingly, for an increasing proportion of the sulphur dioxide and chlorine to react, an increasing reactor volume must be employed.

The unreacted gases, along with the air present in line 28, are forwarded from the falling film primary reactor 38 by line 48 to the packed tower tail gas reactor 40, wherein the remainder of sulphur dioxide is reacted with chlorine and the water fed by line 36 to form a weak mixture of hydrochloric acid and sulphuric acid, which passes by line 42 to the primary reactor 38. The proportion of unreacted gases passing from the primary reactor 38 to the secondary reactor 40 may vary widely, depending on a balance of falling film reactor volume and tail gas reactor volume. Since the tail gas reactor 40 relies for cooling on the volume of water fed thereto and reactor size, it is usual for at least a major proportion of the reaction to be effected in the falling film reactor 38, usually at least about 75% of the reaction and typically about 80%.

The aqueous mixture of hydrochloric acid and sulphuric acid which results from the reaction zone 20 is forwarded by line 44 to the acid feed line 18. Additional quantities of sulphuric acid and hydrochloric acid required to maintain the stoichiometry of the reactions occuring in the generator 10 at the prevailing chlorine dioxide efficiency, are added by line 46, as described in detail in U.S. Pat. No. 4,086,329.

The total acid normality of the aqueous mixture in line 44 is determined by the relative flow rates of sulphur dioxide, chlorine and water to the reaction zone 30 and is preferably is about 7 to about 9 normal typically about 8 normal, because of evaporative requirement considerations of the generator 10. In the generator 10, it is preferred to maintain a substantially constant volume of reaction medium under continuous operation conditions, which necessitates boiling off of water entering and being formed in the generator. Assuming that other sources of water to the generator remain the same, as the strength of the mixed acid in line 44 increases, the volume of water required to be evaporated decreases. However, as the volume of water decreases, the production rate of chlorine dioxide declines. As the strength of mixed acid decreases, the volume of water required to be evaporated increases and hence the external heat requirement increases.

As mentioned above, the total acid normality is preferably about 7 to about 9. At total acid normalities below about 7 normal, the evaportive heat requirements increase dramatically and below about 6 normal are a significant economic burden. At total acid normalities above about 9 normal, the volume of water required to be evaporated decreases significantly producing a significantly decreased production rate. When water from another source can be fed to compensate for the decreased volume present in the mixed acid, the acid strength may range up to about 14 normal.

The evaporative load on the reaction medium usually is such as to produce a weight ratio of steam to chlorine dioxide in the product gas stream of about 7:1, although, based on the strength of the mixed acid feed and the volume of water from other sources, the weight ratio may vary from about 4:1 to about 10:1.

In accordance with this invention, the reactions effected in the reaction zone 30 are carried out in the presence of excess chlorine gas, the unreacted chlorine gas exhibiting the tail gas reactor 40 and hence the reaction zone 30 along with the air by line 50. The chlorine present in the latter stream may be removed by contacting the same with sodium hydroxide solution, before venting the air through an exhaust fan.

The reaction of sulphur dioxide, chlorine and water effected in the reaction zone 30 is controlled in this invention so as to avoid the presence of dissolved sulphur dioxide in the mixed acid stream in line 44. This control is achieved by controlling the partial pressure of chlorine in line 50, which, in turn, is controlled by the chlorine feed in line 32 and/or the air feed in line 19 and/or the sulphur dioxide feed in line 34. As the strength of the mixed acid stream which contains no dissolved sulphur dioxide increases with increasing quantities of sulphur dioxide for the same water volume, then the excess of chlorine required increases, so that the partial pressure of chlorine in line 50 also increases.

The procedure described above with respect to FIG. 1 enables the procedure of U.S. Pat. No. 4,086,329 to be utilized without the difficulties which result from the presence of dissolved sulphur dioxide in the mixed acid stream and with a mixed acid stream of controlled total acid normality.

EXAMPLES

EXAMPLE 1

This Example illustrates the detrimental effect of the presence of dissolved sulphur dioxide on a chlorine dioxide generating process.

(a) A 16 ton/day chlorine dioxide generator contained a boiling reaction medium having a total acid normality of 3.5 N, a temperature of 70° C. and a subatmospheric pressure of 190 mm Hg. A gaseous mixture of chlorine dioxide, chlorine and steam was removed from the generator.

Cell liquor containing 490 gpl $NaClO_3$ and 110 gpl NaCl was fed to the generator at a flow rate of 10 l USGPM. A mixture of hydrochloric acid and sulphuric acid having a total acid normality of 4 N and containing 2 N HCl and 2 N $H_2SO_4$, was also fed to the generator at a flow rate of 10 USGPM. The reaction medium had an orange color as a result of the presence of dichromate ion fed thereto with the cell liquor.

After start up, the reaction medium became saturated with anhydrous sodium sulphate which was removed from the generator in a slurry with reaction medium, filtered to separate it from the reaction medium, and the reaction medium was returned to reaction vessel by a cirulatory pump.

While the generator was running normally in this fashion, the mixed acid feed stream was changed to one containing sulphur dioxide in a dissolved concentration of 18 gpl for a period of three hours. This resulted in the reaction medium turning brown, the density of the reaction medium rising from 1.5 g/cc to 1.7 g/cc, the circulating pump amperage rising from 58 to 64 amps, the chlorine dioxide production rate rising dramatically from 16 to 24 TPD and severe decompositions of chlorine dioxide. After complete shut-down of the generator necessary because of the severe decompositions, the crystals were examined and it was found that, while normally 90 to 95% of the crystals are retained on a 200-mesh screen, only 40 to 50% of the crystals were retained on the screen, indicating a substantial diminution of crystal size.

(b) The experiment set forth in 1(a) above was repeated except that the concentration of dissolved $SO_2$ in the mixed acid stream was 0.1 to 0.2 gpl. After only about 15 minutes, the orange liquor started to turn brown, the circulating pump amperage rose and the crystals settled much more slowly.

The results of Examples 1(a) and 1(b) demonstrate the significantly adverse results which are obtained in a very short period of time when dichromate ion is present in the reaction medium and dissolved $SO_2$ is present in the mixed acid feed, even, as in the case of Example 1(b), when present in very small quantities.

(c) A 10 liter laboratory scale generator was set up containing a boiling reaction medium having a total acid normality of 3.8 N, a temperature of 71° C. and a subatmospheric pressure of 170 mm Hg. A gaseous mixture of chlorine dioxide, chlorine and steam was removed from the generator.

To the reaction medium were fed a 5.75 molar stream of sodium chlorate at a rate of 6.7 ml/min, a 300 gpl stream of sodium chloride at a rate of 6.7 ml/min and an 18 N stream of sulphuric acid. The chemical efficiency of chlorine dioxide production was 91% based on conversion of sodium chlorate to chlorine dioxide.

Thereafter, sulphur dioxide was fed to the reaction medium at a rate of 1.8 g/min, equivalent to an amount of 200 gpl of sulphur dioxide if dissolved in a mixed acid feed. The efficiency of chlorine dioxide production fell to only 73.8% based on the conversion of sodium chlorate to chlorine dioxide.

Although the amount of equivalent dissolved sulphur dioxide in this experiment was abnormally high, it was used to demonstrate that the presence of sulphur dioxide in the chlorine dioxide generator produces a significant decrease in production efficiency. Lesser amounts of dissolved sulphur dioxide produce lesser detrimental effects on efficiency, but any decrease in efficiency presents a considerable economic penalty since the primary source of the chlorine dioxide, namely sodium chlorate, is an expensive chemical.

EXAMPLE 2

This Example illustrates the process of the invention.

(a) The reaction zone 30 illustrated in FIG. 1 was set up. The reaction of sulphur dioxide, chlorine and water was carried out to form a mixture of hydrochloric acid and sulphuric acid. The following Table sets forth the flow rate data for one specific operation.

TABLE I

| Stream | Line No. | Feed Rate |
|---|---|---|
| Chlorine feed | Line 28 | 1245 pph + 300 pph air |
| Sulphur dioxide feed | Line 34 | 780 pph |
| Water feed | Line 36 | 9.8 USGPM |
| HCl/$H_2SO_4$ | Line 44 | 11.0 USGPM of 8 N acid (free from dissolved $SO_2$) |
| Tail gas stream | Line 48 | 117 pph $SO_2$, 510 pph $Cl_2$, 300 pph air |
| Weak acid stream | Line 42 | 10 USGPM of 1.5 N acid |
| Chlorine vent gas stream | Line 50 | 380 pph $Cl_2$, 300 pph air (ie. 252 mm Hg $Cl_2$ pp) |

(b) The experiment set forth in Table I was repeated with the partial pressure of chlorine in line 50 being varied to determine the effect thereof on the dissolved concentration of gases in the mixed acid stream in line 44 at a fixed total acid normality of the mixed acid stream. The flow rates were adjusted to provide a total acid normality of stream 44 of 6.5 normal.

Figure 2:
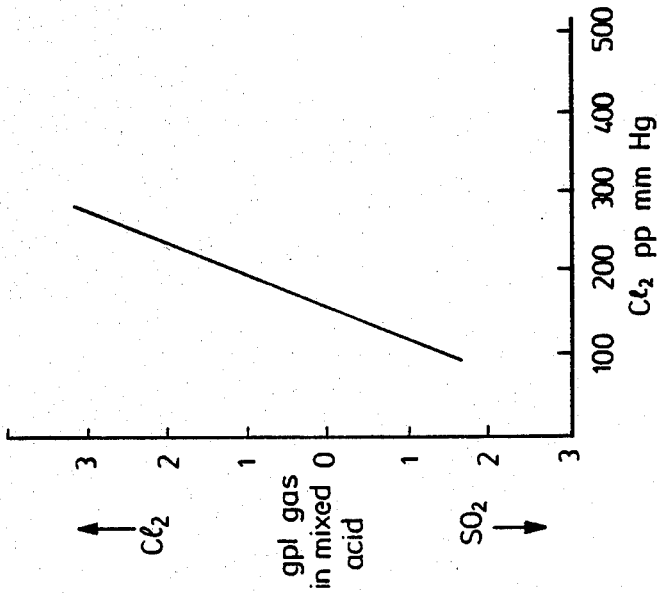
FIG. 2 is a graphical representation of the variation of dissolved gas content in mixed acid with chlorine partial pressure at fixed total acid normality.

The identity and concentration of dissolved gases were determined for each value of chlorine partial pressure. The results were plotted graphically and appear as FIG. 2 of the accompanying drawings. As can be seen from FIG. 2 the relationship between $Cl_2$ partial pressure and dissolved gas concentration at fixed acidity was determined to be a substantially linear one. As the partial pressure increased, the dissolved concentration of sulphur dioxide decreased to a zero value at about 150 mm Hg pp $Cl_2$ and, as the partial pressure increased further, chlorine is an increasingly greater dissolved concentration was present in the mixed acid.

(c) The experiment set forth in Table I again was repeated with the partial pressure of chlorine in line 50 again being varied but this time to determine the upper limit of the total acid normality of stream 44 which still had zero dissolved sulphur dioxide concentration in the mixed acid stream.

Figure 3:
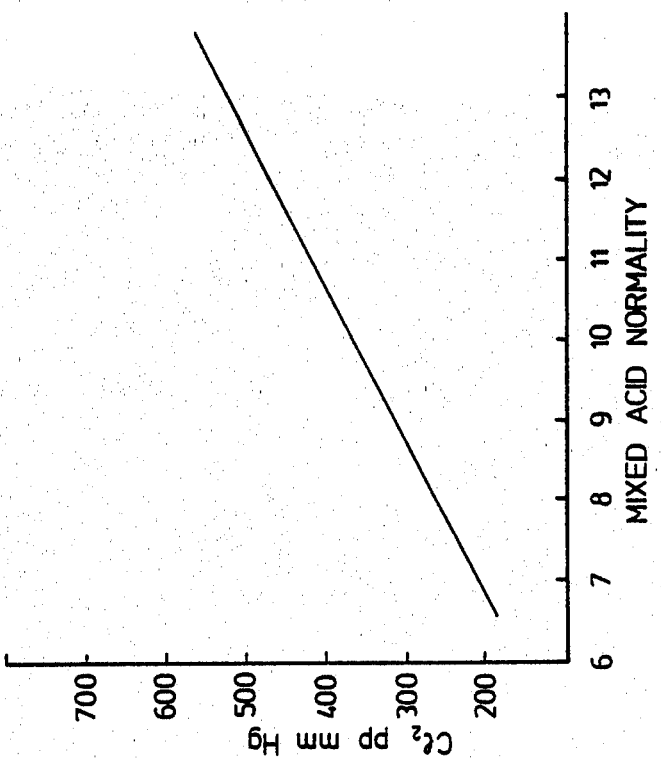
FIG. 3 is a graphical representation of the variation of acid normality with chlorine partial pressure at zero percent dissolved sulphur dioxide in the mixed acid.

The partial pressure of chlorine necessary to produce a varying strength of mixed acid which had zero dissolved sulphur dioxide was determined for each value of acid strength. The results were plotted graphically and appear as FIG. 3 of the accompanying drawings. As may be seen from FIG. 3, the relationship between $Cl_2$ partial pressure and total acid normality at zero concentration of dissolved sulphur dioxide was determined to be a substantially linear one. As the partial pressure increased from about 150 mm Hg to about 550 mm Hg, the total acid normality of the mixed acid stream which could still be produced with zero dissolved sulphur dioxide was increased from 6.5 to 14 normal.

SUMMARY OF DISCLOSURE

In summary of this disclosure, the present invention provides procedures for controlling the characteristics of a mixed hydrochloric acid and sulphuric acid feed stream used in chlorine dioxide production by controlling the partial pressure of chlorine taking part in reaction with sulphur dioxide and water to form the mixed acid. Modifications are possible within the scope of this invention.

What I claim is:

1. A process for the production of chlorine dioxide, which comprises:
reacting sodium chlorate with chloride ions and hydrogen ions in an aqueous acid reaction medium having a total acid normality of about 2 to about 4.8 normal to form chlorine dioxide and chlorine, said chloride ions being provided by hydrochloric acid alone or by hydrochloric acid and sodium chloride and said hydrogen ions being provided by sulphuric acid and said hydrochloric acid, maintaining said reaction medium at its boiling point at a temperature below that above which substantial decomposition of chlorine dioxide occurs while applying a subatmospheric pressure to a first reaction zone containing said reaction medium to form steam in a volume ratio of steam to chlorine dioxide of about 4:1 to about 10:1, depositing anhydrous neutral sodium sulphate from the reaction medium and removing the same from said first reaction zone, removing a gaseous mixture of chlorine dioxide, chlorine and steam from said first reaction zone and forming an aqueous solution of said chlorine dioxide therefrom, said aqueous solution of chlorine dioxide also containing part of said chlorine, forwarding the chlorine not dissolved in said chlorine dioxide solution at substantially atmospheric pressure and in admixture with air to a second reaction zone to which sulphur dioxide and water, along with additional chlorine, if necessary, are fed for reaction between said chlorine, sulphur dioxide and water in the presence of excess chlorine to form an aqueous mixture of hydrochloric acid and sulphuric acid, venting unreacted chlorine and said air from said second reaction zone, controlling the partial pressure of said unreacted chlorine vented from said second reaction zone to a value in the range of about 150 to about 550 mm Hg to provide sufficient of said excess chlorine in said second reaction zone to form said aqueous mixture of hydrochloric acid and sulphuric acid having a total acid normality of about 6 to about 14 normal and from which dissolved sulphur dioxide is absent, and forwarding said aqueous mixture of hydrochloric acid and sulphuric acid to said reaction medium and forwarding such additional quantities of hydrogen ions, chloride ions and sulphate ions to said reaction medium as are required by the stoichiometry of the reactions occurring in the reaction medium.

2. The process of claim 1 wherein the partial pressure of said unreacted chlorine vented from said second reaction zone is controlled so that said aqueous mixture of hydrochloric acid and sulphuric acid has a total acid normality of about 7 to about 9 normal.

3. The process of claim 1 or 2 wherein said unreacted chlorine vented from said second reaction zone has a partial pressure in the range of about 150 to about 550 mm Hg.

4. The process of claim 1, wherein said reaction zone is defined by a primary reaction zone and a tail gas reaction zone, chlorine and sulphur dioxide are fed to said primary reaction zone for reaction with the majority of the sulphur dioxide therein with chlorine and water in the form of a weak aqueous mixture of hydrochloric acid and sulphuric acid, unreacted sulphur dioxide and chlorine are forwarded from the primary reaction zone to said tail gas reaction zone, water is fed to said tail gas reaction zone for reaction with the sulphur dioxide and part of the chlorine in said forwarded stream to form said weak aqueous mixture of hydrochloric acid and sulphuric acid which is forwarded to said primary reaction zone, and said vented unreacted chlorine is vented from said tail gas reaction zone.

5. The process of claim 1, wherein said reaction of sulphur dioxide, chlorine and water is carried out at a temperature below about 70° C.

6. A process for the production of hydrochloric acid and sulphuric acid, which comprises:

separately feeding chlorine, sulphur dioxide and water to a reaction zone;

intimately contacting said chlorine, sulphur dioxide and water in the presence of air and excess chlorine and water and reacting the same in accordance with the equation:

$$SO_2 + Cl_2 + 2H_2O \rightarrow 2HCl + H_2SO_4$$

to form an aqueous mixture of hydrochloric acid and sulphuric acid, venting unreacted chlorine and said air from said reaction zone, controlling the partial pressure of said unreacted chlorine vented from said reaction zone to a value in the range of about 150 to about 550 mm Hg to provide sufficient of said excess chlorine in said reaction zone to form said aqueous mixture of hydrochloric acid and sulphuric acid having a total acid normality of about 6 to about 14 normal and from which dissolved sulphur dioxide is absent, and removing the sulphur dioxide-free aqueous mixture of hydrochloric acid and sulphuric acid from the reaction zone.

7. The process of claim 6 wherein said reaction zone is defined by a primary reaction zone and a tail gas reaction zone, chlorine and sulphur dioxide are fed to said primary reaction zone for reaction of the majority of the sulphur dioxide therein with chlorine and water in the form of a weak aqueous mixture of hydrochloric acid and sulphuric acid, unreacted sulphur dioxide and chlorine are forwarded from the primary reaction zone to said tail gas reaction zone, water is fed to said tail gas reaction zone for reaction with the sulphur dioxide and part of the chlorine in said forwarded stream to form said weak aqueous mixture of hydrochloric acid and sulphuric acid which is forwarded to said primary reaction zone, and said vented unreacted chlorine is vented from said tail gas reaction zone.

8. The process of claim 7, wherein the partial pressure of chlorine in said vented unreacted chlorine is controlled to result in a total acid normality of said aqueous mixture of hydrochloric acid and sulphuric acid removed from the reaction zone of about 7 to about 9 normal.

9. The process of claim 6, 7 or 8 wherein the reaction is carried out at a temperature of below about 70° C.

* * * * *